United States Patent
Toyoshima et al.

(10) Patent No.: US 8,374,505 B2
(45) Date of Patent: Feb. 12, 2013

(54) APPARATUS AND METHOD FOR QUANTUM CRYPTOGRAPHY COMMUNICATION

(75) Inventors: Morio Toyoshima, Tokyo (JP); Mikio Fujiwara, Tokyo (JP); Hiroo Kunimori, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 406 days.

(21) Appl. No.: 12/733,508

(22) PCT Filed: Sep. 2, 2008

(86) PCT No.: PCT/JP2008/065713
§ 371 (c)(1), (2), (4) Date: Mar. 4, 2010

(87) PCT Pub. No.: WO2009/031513
PCT Pub. Date: Mar. 12, 2009

(65) Prior Publication Data
US 2010/0208893 A1    Aug. 19, 2010

(30) Foreign Application Priority Data
Sep. 5, 2007   (JP) .................................. 2007-229604

(51) Int. Cl.
H04J 4/00    (2006.01)
H04J 14/00   (2006.01)
(52) U.S. Cl. .......................................... 398/74; 398/75
(58) Field of Classification Search ............ 398/102
See application file for complete search history.

(56) References Cited

U.S. PATENT DOCUMENTS

| 7,627,126 | B1 * | 12/2009 | Pikalo et al. ............... 380/279 |
| 7,729,615 | B1 * | 6/2010 | Zeffler et al. ............... 398/75 |
| 2004/0136535 | A1 | 7/2004 | Takeuchi |

FOREIGN PATENT DOCUMENTS

| JP | 11-234265 | 8/1999 |
| JP | 2002-281029 | 9/2002 |
| JP | 2004-356996 | 12/2004 |
| JP | 2005-117512 | 4/2005 |
| JP | 2005-260911 | 9/2005 |
| JP | 2005-269034 | 9/2005 |
| JP | 2006-513678 | 4/2006 |

OTHER PUBLICATIONS

Morio Toyoshima et al., "Current status of research and development for space quantum cryptography communications in NICT," Proceedings of the 23rd Space Utilization Symposium, vol. 23, Jan. 2007, pp. 167-170.

(Continued)

*Primary Examiner* — Shi K Li

(57) ABSTRACT

A quantum cryptography communication apparatus performs quantum cryptography communication between a transmitter and a receiver. The quantum cryptography communication apparatus includes first communicating unit transmitting and receiving a communication signal including relatively strong pulse light between the transmitter and the receiver, and second communicating unit transmitting and receiving a relatively weak quantum cryptography signal between the transmitter and the receiver in a period in which the communication signal is off and the attitude axis for the receiver can be adjusted to that for the transmitter by the second communicating unit.

5 Claims, 6 Drawing Sheets

OTHER PUBLICATIONS

Morio Toyoshima et al., "Development of a bread board model for free-space quantum cryptography," Proceedings of the 24th Space Utilization Symposium, vol. 24, Jan. 2008, pp. 82-85.

International Search Report for PCT/JP2008/065713, mailed on Dec. 2, 2008.

English Translation of the International Preliminary Report on Patentability mailed Mar. 18, 2010 and issued in corresponding International Patent Application PCT/JP2008/065713.

\* cited by examiner

APPARATUS AND METHOD FOR QUANTUM CRYPTOGRAPHY COMMUNICATION

CROSS REFERENCE TO RELATED APPLICATIONS

This application claims the benefit under 35 U.S.C. Section 371, of PCT International Application No. PCT/JP2008/065713, filed Sep. 2, 2008, which claimed priority to Japanese Application No. 2007-229604, filed Sep. 5, 2007, the entire disclosures of which are incorporated by reference as a part of this application.

BACKGROUND OF THE INVENTION

1. Field of the Invention

The present invention relates to an apparatus and method for quantum cryptography communication, and more particularly to an apparatus and method for quantum cryptography communication suitable when relative positions between a transmitter and a receiver that perform quantum cryptography communication such as mobile communication in satellites and the like change.

2. Description of the Related Art

In the quantum cryptography communication, a method of generating synchronization signals for loopback in a transmitter and a receiver and transmitting the synchronization signals is proposed for synchronization between the transmitter and the receiver (see Patent Document 1 and Patent Document 2).

In the quantum cryptography communication, a method of exchanging synchronization pulses between QKD stations and locking a phase is proposed in order to surely perform detection of a weak quantum signal (see Patent Document 3).

Further, in the quantum cryptography communication, a method of detecting an optical clock with a photodetector and inputting the output of the detection to a synthesizer via a narrow-band filter to generate timing is proposed (see Patent Document 4).

Patent Document 1: Japanese Laid-Open Patent Publication No. 2005-260911;
Patent Document 2: Japanese Laid-Open Patent Publication No. 2005-117512;
Patent Document 3: National Publication of International Patent Application No. 2006-513678; and
Patent Document 4: Japanese Laid-Open Patent Publication No. 2004-356996.

SUMMARY OF THE INVENTION

According to Patent Document 1 and Patent Document 2, since it is necessary to always take phase synchronization on the transmitter side on the basis of the synchronization signals for loopback, a classical communication path, for example, a loopback transmission path including an optical fiber is essential. Therefore, the quantum cryptography communication cannot be applied to communication in which relative positions between a transmitter and a receiver change, i.e., an arrival angle of light changes (hereinafter referred to as mobile communication) such as mobile communication in satellites and the like.

According to Patent Document 3, since it is necessary to always lock a phase on the basis of the synchronization pulse, the loopback transmission path as the classical communication path is essential. Therefore, as in the case explained above, the quantum cryptography communication cannot be applied to the mobile communication.

Further, according to Patent Document 4, it is necessary to receive the same optical clock signal in a transmitter and a receiver. The method cannot cope with a case in which a clock signal is a data signal.

In addition to the above, according to the examination of the inventor, when it is attempted to apply the quantum cryptography communication to the mobile communication, a new problem occurs in that a base axis for polarization used for quantum cryptography cannot be detected on a reception side between movable bodies that perform the mobile communication. Therefore, it is conceivable that, when the base axis for polarization used for quantum cryptography can be detected on the reception side, the quantum cryptography communication can be applied to the mobile communication.

According to the examination of the inventor, when it is attempted to apply the quantum cryptography communication to the mobile communication, it is necessary to have clocks, which accurately tick, in a transmission system and a reception system and measure time in measuring an arrival time of a photon (a photon pulse) in quantum key distribution. A new problem occurs in that it is difficult to adjust times of both the transmission system and the reception system to each other. Therefore, it is conceivable that, when the times of both the transmission system and the reception system can be accurately adjusted to each other (or means equivalent to this can be obtained), the quantum cryptography communication can be applied to the mobile communication.

It is an object of the present invention to provide a quantum cryptography communication apparatus that can adjust, even when relative positions between a transmitter and a receiver that perform quantum cryptography communication change, a base axis for polarization thereof between the transmitter and the receiver and synchronize signals.

It is another object of the present invention to provide a quantum cryptography communication method that can adjust, even when relative positions between a transmitter and a receiver that perform quantum cryptography communication change, a base axis for polarization thereof between the transmitter and the receiver and synchronize signals.

A quantum cryptography communication apparatus according to the present invention is a quantum cryptography communication apparatus that performs quantum cryptography communication between a transmitter and a receiver. The quantum cryptography communication apparatus includes first communicating unit transmitting and receiving a communication signal including relatively strong pulse light between the transmitter and the receiver, and second communicating unit transmitting and receiving a relatively weak quantum cryptography signal between the transmitter and the receiver in a period in which the communication signal is off.

Preferably, in the quantum cryptography communication apparatus according to the present invention, the second communicating unit transmits and receives the quantum cryptography signal in the period in which the communication signal is off in synchronization with a falling edge of the communication signal after elapse of a delay time set in advance from the falling edge.

Preferably, in the quantum cryptography communication apparatus according to the present invention, the first or second communicating unit includes counters incremented according to transmission speed of the communication signal and reset at a cycle longer than a propagation delay of the communication signal and detect a delay in relative time using the counters.

Preferably, in the quantum cryptography communication apparatus according to the present invention, the first and second communicating unit transmits and receives the communication signal and the quantum cryptography signal on the same optical axis.

Preferably, in the quantum cryptography communication apparatus according to the present invention, the second communicating unit transmits and receives a photon pulse of the quantum cryptography signal, and the first communicating unit performs polarization modulation for the communication signal according to a polarization base for the photon pulse of the quantum cryptography signal.

A quantum cryptography communication method according to the present invention is a quantum cryptography communication method for performing quantum cryptography communication between a transmitter and a receiver. The quantum cryptography communication method includes transmitting and receiving a communication signal including relatively strong pulse light between the transmitter and the receiver, and transmitting and receiving a relatively weak quantum cryptography signal between the transmitter and the receiver in a period in which the communication signal is off.

With the quantum cryptography communication apparatus and method according to the present invention, the first communicating unit transmitting and receiving a communication signal including relatively strong pulse light and the second communicating unit transmitting and receiving a relatively weak quantum cryptography signal in a period in which the communication signal is off are provided. Consequently, it is possible to make a classical communication path, for example, a transmission path including an optical fiber unnecessary and apply the quantum cryptography communication to mobile communication in satellites and the like. Since a type of the communication signal may be any type, it is possible to apply the quantum cryptography communication even when the communication signal is a data signal.

With the quantum cryptography communication apparatus according to the present invention, the quantum cryptography signal is transmitted and received in the period in which the communication signal is off in synchronization with a falling edge of the communication signal after elapse of a delay time set in advance from the falling edge. Consequently, it is possible to transmit and receive a relatively weak (actually, extremely weak) quantum cryptography signal without being disturbed by a communication signal including relatively strong pulse light.

With the quantum cryptography communication apparatus according to the present invention, a delay in relative time is detected by using the counters incremented according to transmission speed of the communication signal and reset at a cycle longer than a propagation delay of the communication signal. Consequently, when an arrival time of a photon is measured in quantum key distribution, it is possible to eliminate the necessity of having clocks, which accurately tick, in the transmission system and the reception system and eliminate the necessity of adjusting times of both the transmission system and the reception system to each other.

With the quantum cryptography communication apparatus according to the present invention, the communication signal and the quantum cryptography signal are transmitted and received on the same optical axis. Consequently, since only one optical axis has to be adjusted, it is possible to easily adjust the optical axis between the transmitter and the receiver.

With the quantum cryptography communication apparatus according to the present invention, polarization modulation for the communication signal is performed according to a polarization base for a photon pulse of the transmitted and received quantum cryptography signal. Consequently, it is possible to detect, on the reception side between movable bodies that perform the mobile communication, a base axis for polarization used for quantum cryptography.

DETAILED DESCRIPTION OF THE PREFERRED EMBODIMENTS

Figure 1:
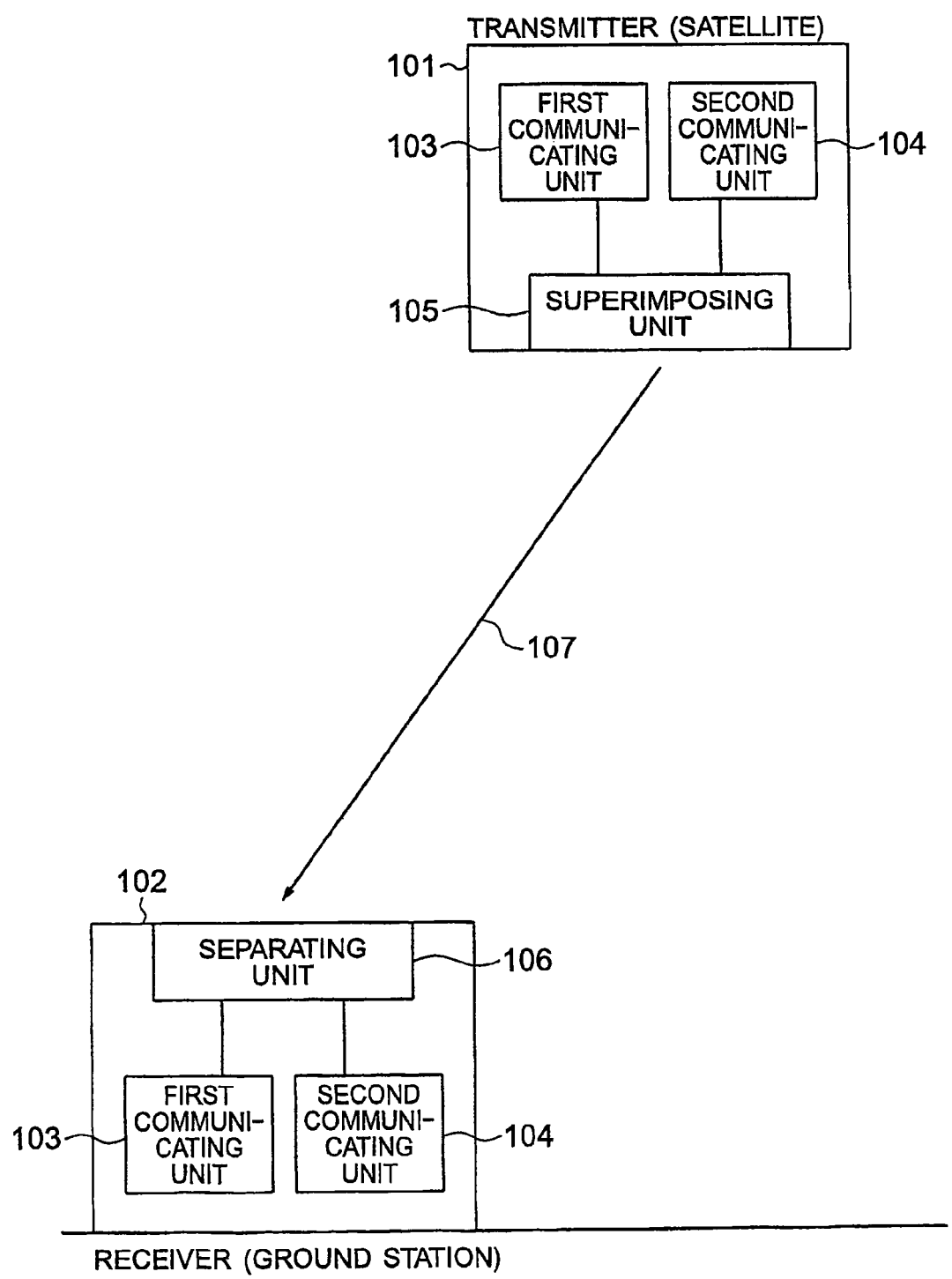
FIG. 1 is a diagram of a quantum cryptography communication apparatus according to the present invention.

FIG. 1 is a diagram of a quantum cryptography communication apparatus according to the present invention and illustrates an example of a configuration of the quantum cryptography communication apparatus according to the present invention.

The quantum cryptography communication apparatus includes a transmitter 101 and a receiver 102 and performs quantum cryptography communication employing an optical signal (a laser beam) between the transmitter 101 and the receiver 102. The transmitter 101 includes, for example, a communication satellite 101. In other words, the transmitter 101 is a movable body. The receiver 102 includes, for example, a ground station (a base station) 102. In other words, the receiver 102 is a fixed station.

The quantum cryptography communication apparatus includes first communicating unit 103 and second communicating unit 104. The first communicating units 103 are provided in the transmitter 101 and the receiver 102, respectively, and transmit and receive a communication signal including relatively strong pulse light between the transmitter 101 and the receiver 102. The communication signal includes, for example, a data signal (e.g., a moving image). The second communicating units 104 are provided in the transmitter 101 and the receiver 102, respectively, and transmit and receive a relatively weak (extremely weak) quantum cryptography signal between the transmitter 101 and the receiver 102 in a period in which the communication signal is off.

As it is seen from FIG. 1, there is one optical path 107 between the transmitter 101 and the receiver 102. Specifically, an optical path (a transmission path or a communication path) by the first communicating unit 103 and an optical path by the second communicating unit 104 coincide with each other. In other words, the optical paths are the same optical axis 107. Therefore, superimposing unit 105 for superimposing and outputting an optical signal from the first communicating unit 103 and an optical signal from the second communicating unit 104 is provided in the transmitter 101. Separating unit 106, which receives and separates the superimposed and output optical signals, is provided in the receiver 102.

Figure 2:
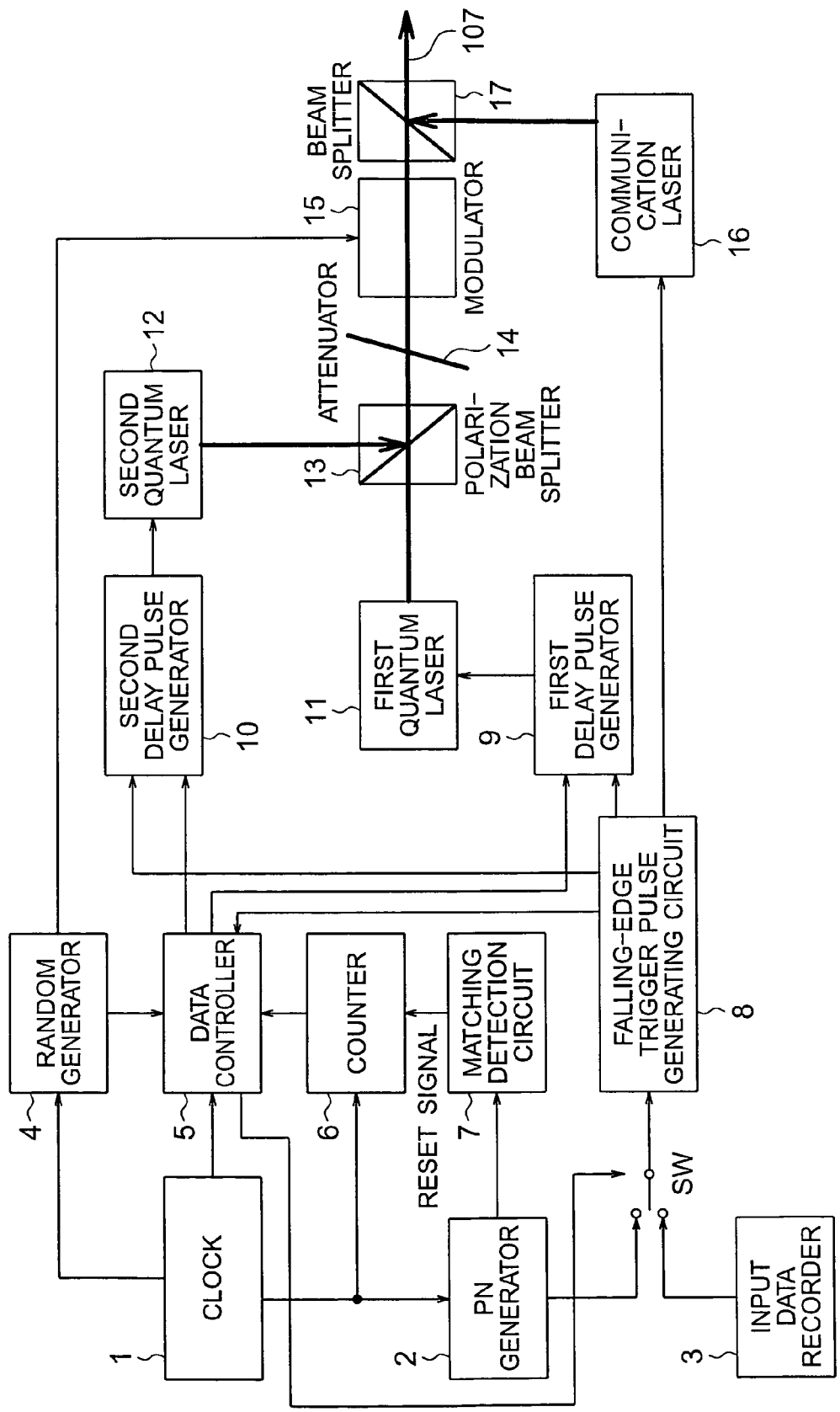
FIG. 2 is a diagram of a transmitter of the quantum cryptography communication apparatus according to the present invention.
Figure 3:
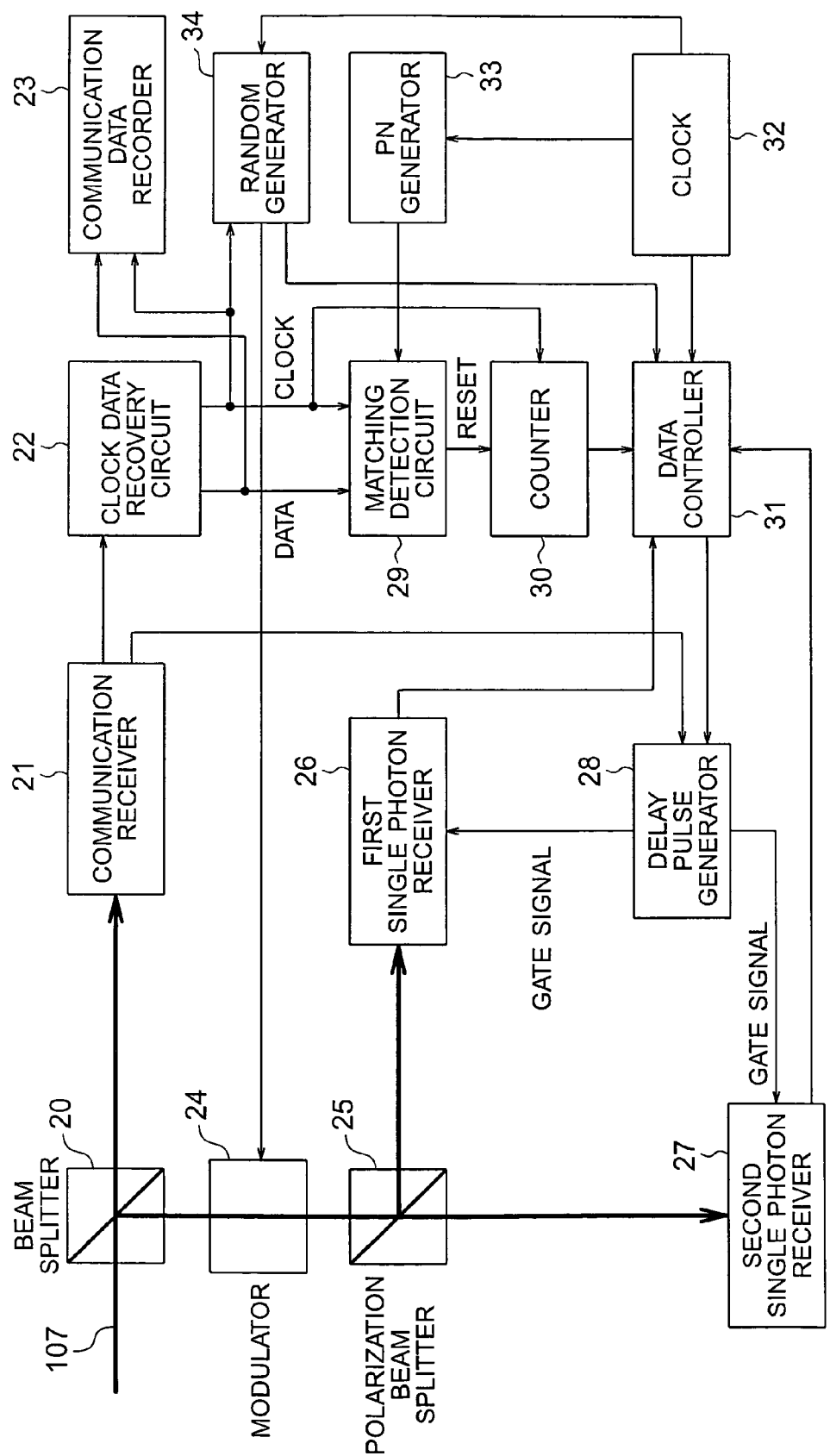
FIG. 3 is a diagram of a receiver of the quantum cryptography communication apparatus according to the present invention.
Figure 4:
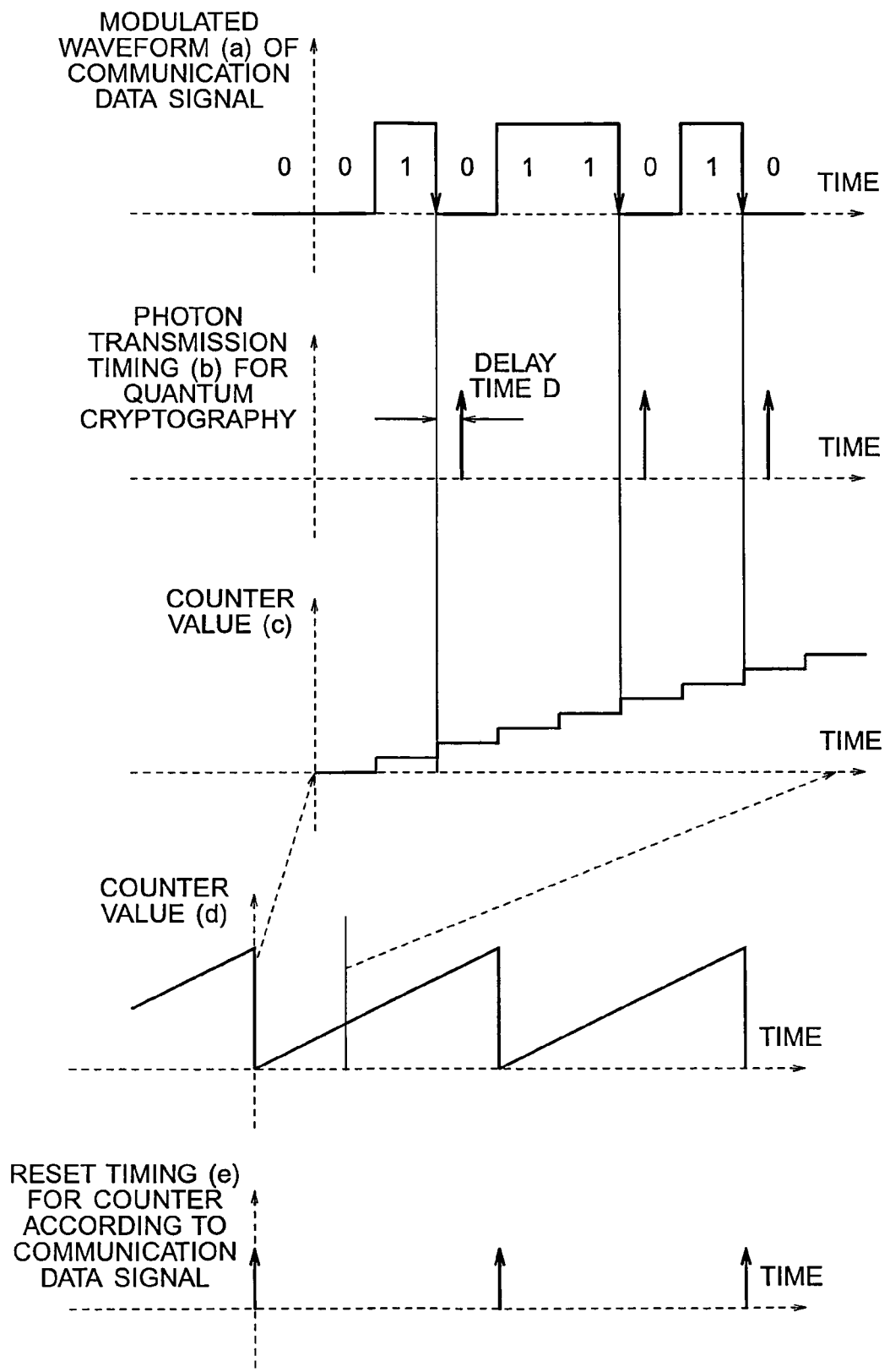
FIG. 4 is an explanatory diagram of quantum cryptography communication according to the present invention.

FIGS. 2 and 3 are diagrams of the transmitter 101 and the receiver 102 of the quantum cryptography communication apparatus according to the present invention, respectively. In FIGS. 2 and 3, thick lines indicate optical signals and thin lines indicate electric signals. FIG. 4 is an explanatory diagram of quantum cryptography communication according to the present invention and illustrates, in particular, superimposition of a quantum cryptography signal on a communication signal and identification of time of the quantum cryptography signal.

First, transmission of a communication signal by the first communicating unit 103 in the transmitter 101 is explained with reference to FIG. 2. The first communicating unit 103 in the transmitter 101 basically includes an input data recorder 3, a falling-edge trigger pulse generating circuit (hereinafter, trigger generating circuit) 8, and a communication laser 16. A beam splitter 17 is the superimposing unit 105.

Prior to transmission of input data, a PN signal (a pseudo noise signal or a pseudo random signal) is input to the trigger generating circuit 8 via a switch SW. Therefore, at this point, the switch SW is adapted to connect a PN generator 2 and the trigger generating circuit 8 according to a switch control signal explained later. The PN generator 2 generates and outputs a PN signal having a data pattern set in advance in synchronization with, for example, a 10 MHz clock (generator) 1. As the clock 1, for example, a GPS clock is used. The PN signal is input to the trigger generating circuit 8 and a matching detection circuit 7. Instead of the clock 1, a clock having a high frequency at the same level may be used (the same holds true for other circuits explained below).

The trigger generating circuit 8 detects a falling edge of the PN signal on the basis of the PN signal, generates a falling-edge trigger pulse in synchronization with the falling edge, and inputs the PN signal to the communication laser 16 (a laser beam source). The detected falling edge (and the falling-edge trigger pulse) is indicated by an arrow in a modulated waveform (a) illustrated in FIG. 4.

The falling-edge pulse is input to a data controller 5 and first and second delay pulse generators 9 and 10 (as explained later). The communication laser 16 generates, on the basis of the PN signal (an electric signal), a communication signal (a binary optical signal) including relatively strong pulse light and outputs the communication signal. The communication signal is indicated by the modulated waveform (a) illustrated in FIG. 4. In the communication laser 16, wavelength λ1 of the communication signal is empirically set in advance and intensity thereof (intensity of the pulse light) is set in advance. Output light of the communication laser 16 is input to the beam splitter 17.

The beam splitter 17 superimposes an optical signal having the wavelength λ1 from the communication laser 16 and an optical signal having wavelength λ2 (explained later) from a polarization beam splitter 13 and outputs the superimposed optical signal along the same optical axis 107. The beam splitter 17 is set to (substantially) directly reflect the light (the communication signal) having the wavelength λ1 and directly transmit light (a quantum cryptography signal) having the wavelength λ2.

The PN signal is output from the communication laser 16 prior to input data. Consequently, a PN signal having the predetermined data pattern is transmitted to the receiver 102. The PN signal is output from the communication laser 16 in the same manner as the input data.

On the other hand, the PN signal output by the PN generator 2 is input to the matching detection circuit 7. The matching detection circuit 7 compares the PN signal and a data pattern included in advance (not illustrated) in synchronization with the clock 1 (not illustrated) and, when the PN signal and the data pattern coincide with each other, forms and outputs a reset signal.

The reset signal from the matching detection circuit 7 is input to a counter 6. The counter 6 is reset according to the reset signal and counts the clock 1. The counting of the clock 1 is explained later. Count output (a count value) of the counter 6 is input to the data controller 5. The data controller 5 forms a switch control signal according to input of a first count value from the counter 6 and outputs the switch control signal.

The switch control signal is applied to the switch SW. Consequently, the switch SW is changed over to connect the input data recorder 3 and the trigger generating circuit 8. As a result, input data (a binary signal) stored in the input data recorder 3 is input to the trigger generating circuit 8 via the switch SW. Therefore, data (input data) that should be transmitted as a communication signal is prepared in the input data recorder 3 in advance (e.g., stored in the memory or prepared as real-time stream data, etc.). The input data is arbitrary data. After quantum key sharing is performed, the input data is data (e.g., a moving image) encrypted by quantum cryptography (key data). Although not illustrated, the input data recorder 3 starts transmission of data according to a switch control signal and transmits input data in synchronization with the clock 1.

Consequently, in the same manner as the PN signal, the communication laser 16 generates a communication signal (a binary optical signal) on the basis of the input data (data that should originally be transmitted) and outputs the communication signal. The communication signal is superimposed with a quantum cryptography signal and output from the beam splitter 17.

In this way, transmission and reception of the data that should originally be transmitted is started according to the transmission (and the reception) of the PN signal having the predetermined data pattern. Therefore, the PN signal having the predetermined data pattern is a start signal for data communication. Instead of using the PN generator 2 as the start signal, pseudo data having a predetermined data pattern same as that of the start signal may be added to the head of the input data.

Next, transmission of a quantum cryptography signal by the second communicating unit 104 in the transmitter 101 is explained with reference to FIG. 2. The second communicating unit 104 in the transmitter 101 basically includes a random generator 4, the data controller 5, the first and second delay pulse generators 9 and 10, first and second quantum lasers 11 and 12, a polarization beam splitter 13, an attenuator 14, and a modulator 15. Components other than components included in the first and second communicating unit 103 and 104 may be considered components common to the first and second communicating unit 103 and 104 (the same holds true in the receiver 102).

The random generator 4 generates a random signal (a binary signal), which takes a random value, in synchronization with the clock 1 and inputs the random signal to the data controller 5 and the modulator 15. This random signal is a quantum key (a cryptograph key or key data). The data controller 5 forms an output signal on the basis of the random signal and outputs the output signal. The output signal is input to the first and second delay pulse generators 9 and 10. The output signal is a control signal for (selectively) causing one of the first and second delay pulse generators 9 and 10 to output a delay pulse according to the random signal (i.e., at random). At this point, for example, the data controller 5 forms the output signal in synchronization with the clock 1 and outputs the output signal in synchronization with the falling-edge trigger pulse (see the modulated waveform (a) illustrated in FIG. 4) output from the trigger generating circuit 8. Therefore, the output signal is output only when the falling-edge trigger pulse is input and causes one of the first and second delay pulse generators 9 and 10 to output the delay pulse.

The output signal of the data controller 5 is input to an input terminal of one of the first and second delay pulse generators 9 and 10. The falling-edge trigger pulse output from the trigger generating circuit 8 is input to an input terminal of the other of the first and second delay pulse generators 9 and 10.

The first delay pulse generator 9 generates, only when the output signal of the data controller 5 is input, a delay pulse on the basis of the falling-edge trigger pulse after a delay of the delay time D from the falling-edge trigger pulse and inputs the delay pulse to the first quantum laser (quantum cryptography) 11. The delay pulse is indicated by photon transmission timing (b) illustrated in FIG. 4. The delay time D is empirically set in advance. The first quantum laser 11 generates, on the basis of the delay pulse, a quantum cryptography signal (a binary optical signal) including not-so-strong pulse light and outputs the quantum cryptography signal. The intensity of the quantum cryptography signal (pulse light) is set in advance and set low compared with that of the communication signal. The wavelength $\lambda 2$ of the quantum cryptography signal is empirically set in advance. The output of the first quantum laser 11 is input to the, polarization beam splitter 13. The same holds true for the second delay pulse generator 10 and the second quantum laser 12.

The delay time D is set to time sufficiently shorter than one cycle of transmission and reception of the communication signal (therefore, one cycle of the clock 1). Therefore, in the second communicating unit 104, the quantum cryptography signal is transmitted and received in synchronization with a falling edge of the communication signal (with the falling edge as a reference) after elapse of the delay time D set in advance from the falling edge in a period in which the communication signal is off.

For example, polarization of the output of the first quantum laser 11 is set as H (or V), i.e., a polarization direction of the output is set to 0 degree (or the polarization direction is set to 90 degrees). This corresponds to, for example, 0 (or 1) of a binary signal. For example, polarization of the output of the second quantum laser 12 is set as V (or H), i.e., a polarization direction of the output is set to 90 degrees (or the polarization direction is set to 0 degree). This corresponds to, for example, 1 (or 0) of the binary signal.

The polarization beam splitter 13 superimposes and outputs the outputs of the first and second quantum lasers 11 and 12. The polarization beam splitter 13 is set to directly transmit the output (the polarization H) of the first quantum laser 11 and directly reflect the output (the polarization V) of the second quantum laser 12. Actually, since the only one of the first and second quantum lasers 11 and 12 outputs an optical signal, the polarization beam splitter 13 outputs one of the outputs of the first and second quantum lasers 11 and 12. As explained above, the polarization beam splitter 13 outputs light (a photon) having the polarization H or V on the basis of the data for a quantum key.

The optical output of the polarization beam splitter 13 is input to the modulator 15 via the attenuator 14. The attenuator 14 weakens the optical output of the polarization beam splitter 13 to be equal to or smaller than one photon per one pulse in the receiver 102 taking into account a propagation loss. Consequently, the quantum cryptography signal (pulse light) is changed to a binary optical signal including relatively weak (extremely weak) pulse light. The intensity of the quantum cryptography signal is set in advance and the quantum cryptography signal is weak compared with the communication signal.

Figure 5:
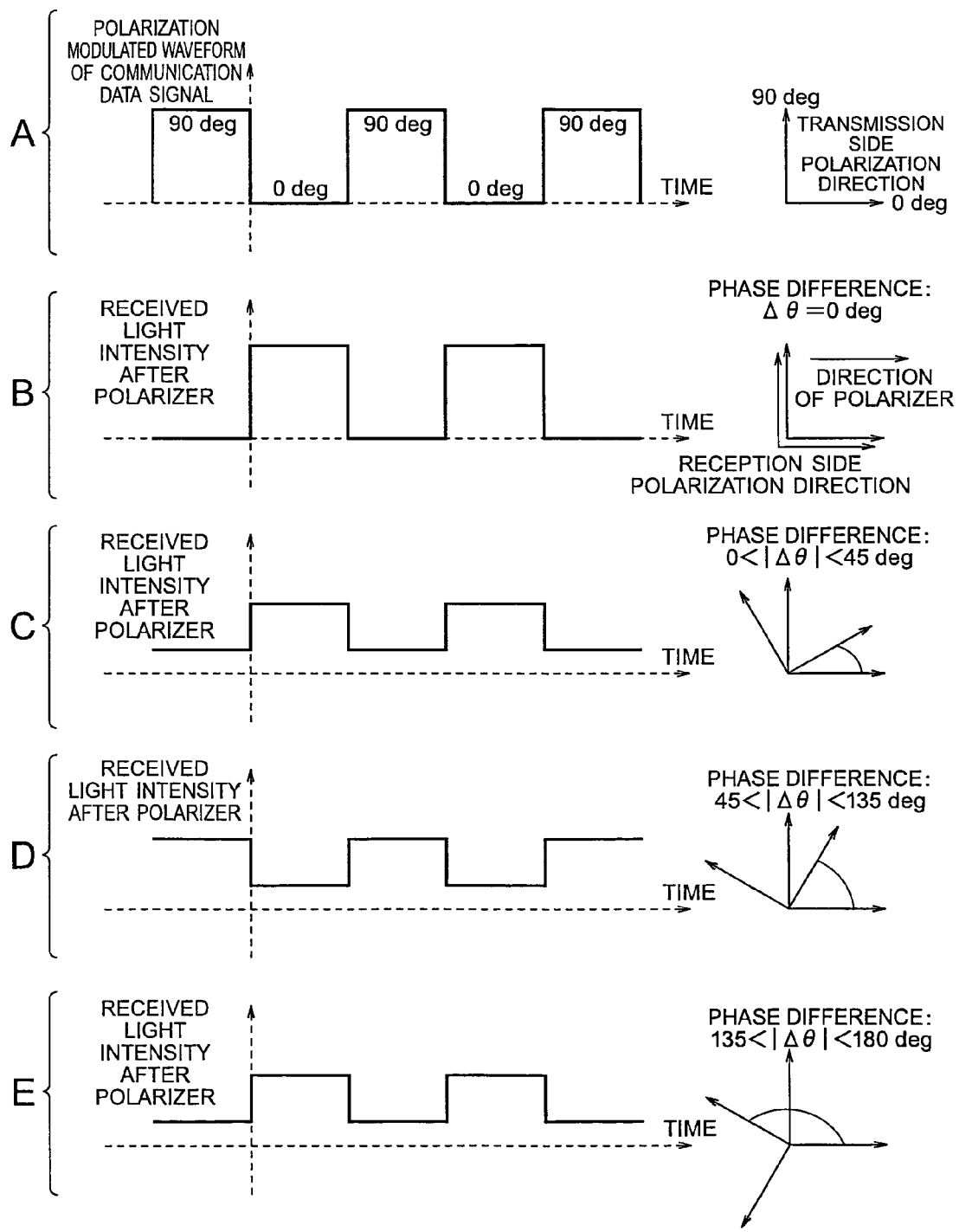
FIG. 5 is another diagram of the quantum cryptography communication apparatus according to the present invention.

The random signal from the random generator 4 is input to the modulator 15 as a modulation signal thereof. The modulator 15 modulates a polarization direction of the optical output of the polarization beam splitter 13 on the basis of the modulation signal and then inputs the optical output to the beam splitter 17. Specifically, the modulator 15 changes (modulates) the polarization direction of the optical output from the polarization beam splitter 13, which has the polarization H (0 degree) or V (90 degrees), by 45 degrees at random. The polarization direction of the optical output (polarization of the quantum cryptography signal) from the modulator 15 is as illustrated in FIG. 5.

Consequently, the light (the communication signal) from the communication laser 16 and the light (the quantum cryptography signal) from the modulator 15 are superimposed and output in a predetermined direction. In other words, the first and second communicating units 104 transmit and receive the communication signal and the quantum cryptography signal on the same optical axis 107. This may be considered a signal obtained by superimposing the modulated waveform (a) and the photon transmission timing (b) illustrated in FIG. 4. Therefore, the weak optical signal (quantum cryptography signal) having the polarization of H or V from the first and second quantum lasers 11 and 12 is polarized and modulated according to the key data after the fixed delay time D from a falling edge of the output of the communication laser 16 and transmitted together with the communication laser 16.

On the other hand, data as a base of the quantum key (key data) transmitted as the quantum cryptography signal is stored in the data controller 5. Therefore, the data controller 5 includes a memory (not illustrated).

As explained above, the reset signal from the matching detection circuit 7 is input to the counter 6. The counter 6 counts the clock 1. Since the input data is transmitted in synchronization with the clock 1, the counter 6 is incremented according to transmission speed (i.e., a transmission clock) of the communication signal. A state of the increment of the counter 6 is indicated by a counter value (c) illustrated in FIG. 4. The counter 6 is reset according to the reset signal and, specifically, reset at a cycle longer than a propagation delay of the communication signal. This is indicated by a counter value (d) illustrated in FIG. 4. The propagation delay of the communication signal can be empirically known in advance. As indicated by a dotted line in FIG. 4, as the counter value (c), a part of one cycle of the counter value (d) is temporally expanded and illustrated.

For the reset, the PN generator 2 forms and outputs a PN signal having a predetermined data pattern at a cycle longer than the propagation delay of the communication signal. Therefore, the counter 6 is reset at the cycle longer than the propagation delay of the communication signal. As a result, a counter value of the counter 6 has a saw-tooth shape as indicated by the counter value (d). Timing (a cycle) for reset is indicated by reset timing (e) illustrated in FIG. 4. The same holds true for a counter 30 explained later. Consequently, it is possible to detect a delay in relative time in transmission and reception of the communication signal and the quantum cryptography signal using the counter 6 (and 30) without a clock that indicates absolute time.

Actually, the PN generator 2 continuously outputs the PN signal having the predetermined data pattern until quantum key sharing is performed. When the quantum key sharing is performed, the switch SW is changed over to the input data recorder 3 side. Thereafter, data pattern is transmitted from the communication laser 16 to the receiver 102. In the transmitter 101, the switch SW is changed over to the input data recorder 3 side and the key sharing can be performed on a quasi real time basis while input data is transmitted from the input data recorder 3.

The count output (the count value) of the counter 6 is input to the data controller 5. Although not illustrated, the data controller 5 generates data for a key (data as a base of the cryptograph key). The data controller 5 stores (records) a signal of the data for the key and the random signal from the random generator 4 together with (in association with) a count value from the counter 6 at that point. In other words, key data at each count value of the counter 6 and data polarized and modulated at random are recorded. Consequently, it is possible to record which of optical signals having the polarizations of H and V is formed at which timing (which clock from the start) after the transmission of the communication signal is started. In other words, it is possible to learn the cryptograph key in the transmitter 101.

In the transmitter 101, the modulator 15 may be omitted and four quantum lasers may be provided. Specifically, in addition to the first and second quantum lasers 11 and 12 for H and V, a quantum laser that outputs light having polarization of H+45 degrees and a quantum laser that outputs light having polarization of V+45 degrees may be provided. In the transmitter 101, the modulator 15 may be omitted and two quantum lasers having non-orthogonal binary polarization (H and H+45 degrees) may be provided.

In the transmitter 101, only one quantum laser may be provided and the output from the quantum laser may be modulated by the modulator 15 in quaternary values (H, V, H+45 degrees, and V+45 degrees). In the transmitter 101, only one quantum laser may be provided and the output from the quantum laser may be modulated by the modulator 15 in non-orthogonal binary values (H and H+45 degrees).

Next, reception of a communication signal by the first communicating unit 103 in the receiver 102 is explained with reference to FIG. 3. A beam splitter 20 is the separating unit 106. The first communicating unit 103 in the receiver 102 basically includes a communication receiver 21, a clock data recovery circuit 22, and a communication data recorder 23.

As explained above, in the optical signal from the transmitter 101, the communication signal from the communication laser 16 and the quantum cryptography signal from the modulator 15 are superimposed. The optical signal is received by the beam splitter 20. The optical signal from the transmitter 101 is distributed by the beam splitter 20 and input to the communication receiver 21 and a modulator 24. The beam splitter 20 is set to directly transmit light (the communication signal) having the wavelength λ1 and directly reflect light (the quantum cryptography signal) having the wavelength λ2. Therefore, the communication signal is input to the communication receiver 21 and the quantum cryptography signal is input to the modulator 24.

The communication receiver 21 converts the input optical signal (communication signal) into an electric signal and outputs the electric signal. The output of the communication receiver 21 is input to the clock data recovery circuit 22 and a delay pulse generator 28. The clock data recovery circuit 22 extracts a clock from the input communication signal with well-known clock data recovery means, and outputs the communication signal (hereinafter referred to as data) and the clock. The data and the clock are input to the communication data recorder 23 and stored (recorded). This is arbitrary data obtained as a transmission result. After the quantum key sharing is performed, this is a communication signal, i.e., data (e.g., a moving image) encrypted by quantum cryptography (key data).

As explained above, the PN signal having the predetermined data pattern is transmitted as the communication signal prior to the input data. Therefore, the stored data includes the PN signal having the predetermined data pattern at the head of the data. However, since the data pattern of the PN signal is the predetermined pattern, it is easy to exclude the data pattern from the stored data. Consequently, the original data can be obtained.

The data and the clock are input to the matching detection circuit 29. The PN signal as the output of a PN generator 33 is input to the matching detection circuit 29. Therefore, the PN generator 33 generates and outputs a PN signal having a data pattern set in advance in synchronization with a clock 32. As the clock 32, for example, a GPS clock is used. The matching detection circuit 29 compares the PN signal and the input data in synchronization with the input clock. When the PN signal and the data coincide with each other, the matching detection circuit 29 forms and outputs a reset signal. Therefore, the reset signal is output when the PN signal having the predetermined data pattern transmitted prior to the input data is detected as coinciding with the input data.

For example, although not illustrated, the communication data recorder 23 may discard, according to the reset signal, the data (the PN signal) stored to that point. Consequently, the communication data recorder 23 can record only the input data as the original data excluding the PN signal.

Next, reception of a quantum cryptography signal by the second communicating unit 104 in the receiver 102 is explained with reference to FIG. 3. The second communicating unit 104 in the receiver 102 basically includes the modulator 24, a polarization beam splitter 25, first and second single photon receivers 26 and 27, the delay pulse generator 28, a data controller 31, and a random generator 34.

The random generator 34 generates a random signal (a binary signal), which takes a random value, in synchronization with the clock 32 and inputs the random signal to the modulator 24 and the data controller 31. The modulator 24 modulates a polarization direction of light from the beam splitter 20 on the basis of the random signal (a modulation signal) from the random generator 34 and then inputs the light to the polarization beam splitter 25. Specifically, the modulator 24 modulates light, which is obtained by modulating a polarization direction of light having polarization H (0 degree) or V (90 degrees) at random by 45 degrees, at random by 45 degrees and inputs the light to the polarization beam splitter 25. Therefore, a polarization direction of optical output (polarization of the quantum cryptography signal) from the modulator 24 is as illustrated in FIG. 5.

The optical signal modulated by the modulator 24 is distributed by the polarization beam splitter 25 and input to the first and second single photon receivers 26 and 27. The polarization beam splitter 25 is set to, for example, directly reflect the optical signal having the polarization H (the output of the first quantum laser) and directly transmit the optical signal having the polarization V (the output of the second quantum laser). Consequently, the optical signal having the polarization H is input to the first single photon receiver 26 and the optical signal having the polarization V is input to the second single photon receiver 27.

The output of the communication receiver 21 is input to the delay pulse generator 28. The delay pulse generator 28 detects, on the basis of the output of the communication receiver 21, a falling edge of the output, forms a gate signal after a delay of the delay time D from the falling edge, and inputs the gate signal to the first and second single photon receivers 26 and 27 as a control signal. This delay pulse generator 28 is a circuit common to the first and second single photon receivers 26 and 27 and includes a circuit equivalent to the trigger generating circuit 8.

The first single photon receiver 26 opens a gate thereof according to the gate signal, receives the light from the polarization beam splitter 25 only in a period in which the gate is opened, converts the light into an electric signal, and outputs the electric signal. The output of the first single photon receiver 26 is input to the data controller 31. The same holds true for the second single photon receiver 27.

As explained above, the quantum cryptography signal (the photon) is transmitted in synchronization with (a bit of) the relatively strong communication signal different from the weak quantum cryptography signal when the optical signal of the communication signal is off, the gate is opened at timing synchronizing with the communication signal, and a weak photon pulse for quantum cryptography is detected. Consequently, it is possible to suppress background light noise and isolate an optical communication path and a quantum communication path. In particular, it is possible to detect a photon pulse using the gate by relatively setting the delay time D from (the ON period of the communication signal. It is possible to apply the present invention even under a situation in which background light is present such as space transmission. Consequently, even when there is a transmission delay, it is possible to detect a weak photon pulse for quantum cryptography. Therefore, even when arbitrary content data is transmitted as the communication signal, it is possible to cause the data signal and the quantum cryptography signal to coexist.

The data controller 31 includes a memory (not illustrated) and stores (records) the outputs of the first and second single photon receivers 26 and 27 in synchronization with the clock 1.

As explained above, the reset signal from the matching detection circuit 29 is input to the counter 30. The counter 30 counts the clock from the clock data recovery circuit 22. The counter 30 is reset according to the reset signal. The count output (the count value) of the counter 30 is input to the data controller 31.

The data controller 31 stores the count output (the count value) of the counter 30 at that point in association with the outputs of the first and second single photon receivers 26 and 27. This is data as a base of a cryptograph key obtained as a transmission result. Therefore, the data controller 31 includes the memory (not illustrated). Consequently, it is possible to record which of optical signals having the polarizations of H and V is formed at which timing (which clock from the start) after the transmission of the communication signal is started. In other words, it is possible to record data as a base of the cryptograph key in the receiver 102. The quantum key is obtained by confirming, with general communicating means, that data polarized at random coincide in transmission and reception and then subjecting the data to data processing. Specifically, the data controllers 5 and 31 perform the communication and confirm that data as bases of quantum keys recorded by the data controllers 5 and 31, respectively, coincide with each other.

As explained above, in the counter 30 (and 6) incremented at data transmission speed, it is possible to reduce the number of bits of the counter 30 by resetting the counter 30 at a cycle longer than a propagation delay. In the mobile communication, even when a propagation distance changes, it is possible to detect a delay in relative time with the counter 30.

Specifically, in the receiver 102, it is possible to learn the head of data by resetting the counter 30 (and 6) at a fixed cycle. Then, the cycle is set longer than propagation delay time from transmission to reception. Consequently, it is possible to identify transmission and reception data according to a relative propagation delay. Therefore, even when the receiver 102 (and the transmitter 101) does not have absolute time, it is possible to identify time of a weak photon pulse for quantum cryptography and reduce the number of bits of the counter 30.

As explained above, the light (the communication signal) from the communication laser 16 and the light (the quantum cryptography signal) from the modulator 15 are separated, a data and a clock are detected from the communication signal, the gates of the single photon receivers 26 and 27 are opened after the fixed delay time D from a falling edge of the clock, and a weak optical signal having the polarization of H or V is detected.

In the receiver 102, the modulator 24 may be omitted and four single photon receivers may be provided. Specifically, single photon receivers that receive lights having polarizations of H, V, H+45 degrees, and V+45 degrees may be provided.

FIG. 5 is another diagram of the quantum cryptography communication apparatus according to the present invention. In this example, in particular, in the examples illustrated in FIGS. 1 to 4, the first communicating unit 103 further performs polarization modulation for the communication signal according to the polarization base for the photon pulse of the quantum cryptography signal, after the photon pulse is transmitted and received by the second communicating unit 104.

As illustrated in part A of FIG. 5, the transmitter 101 performs the polarization modulation for the communication signal (the optical signal) according to the polarization base for the quantum cryptography signal in synchronization with the data signal (e.g., at timing of the reset of the counter 6). For example, the polarization direction is set to 0 degree (the polarization H) and 90 degrees (the polarization V).

In the receiver 102, when it is assumed that an attitude angle (phase) difference in a polarization direction relatively shifts by $\Delta\theta$, the attitude angle differences are as illustrated in part B to part E of FIG. 5. Specifically, in the receiver 102, by adjusting a half wave plate and the like such that an AC component of reception light is maximized at a post stage of the polarizer (the polarization beam splitter) 20, it is possible to adjust the receiver polarization axis to a polarization base axis selected by the transmitter 101.

For example, when the polarizer is set at 0 degree (the horizontal direction), when the phase difference $\Delta\theta$ is 0 degree, as illustrated in part B of FIG. 5, although the polarity of a received signal is inverted, the amplitude (the intensity) of the signal does not change. When the phase difference $\Delta\theta$ is 0 degree to 45 degrees, as illustrated in part C of FIG. 5, the polarity of the received signal is inverted and the amplitude (the intensity) of the signal slightly decreases. When the phase difference $\Delta\theta$ is 45 degrees to 135 degrees, as illustrated in part D of FIG. 5, although the polarity of the received signal is not inverted, the amplitude (the intensity) of the signal slightly decreases. When the phase difference $\Delta\theta$ is 135 degrees to 180 degrees, as illustrated in part E of FIG. 5, the polarity of the received signal is inverted and the amplitude (the intensity) of the signal slightly decreases. Even when $\Delta\theta=90$ degrees, although an AC component of the received signal is maximized, it is possible to identify that polarization directions are different by 90 degrees because the phase is inverted 180 degrees.

As explained above, the polarization modulation for the communication signal (the optical signal) is performed according to the polarization base for the photon pulse for quantum cryptography in synchronization with the timing of the communication signal (data). Consequently, even when a relation of an arrival angle relatively changes as in the mobile communication, it is possible to adjust the half wave plate and the like to maximize the AC component of the optical signal at the post stage of the polarizer, detect a polarization axis direction, and adjust the polarization modulation to a polarization base axis selected by the transmission side. It is possible to detect a polarization direction of the weak photon pulse for quantum cryptography. Consequently, it is possible to learn a polarization base for the weak photon pulse for quantum cryptography according to the received signal of the communication signal. It is possible to detect the polarization base for the weak photon pulse for quantum cryptography by applying the polarization modulation to the communication signal.

Figure 6:
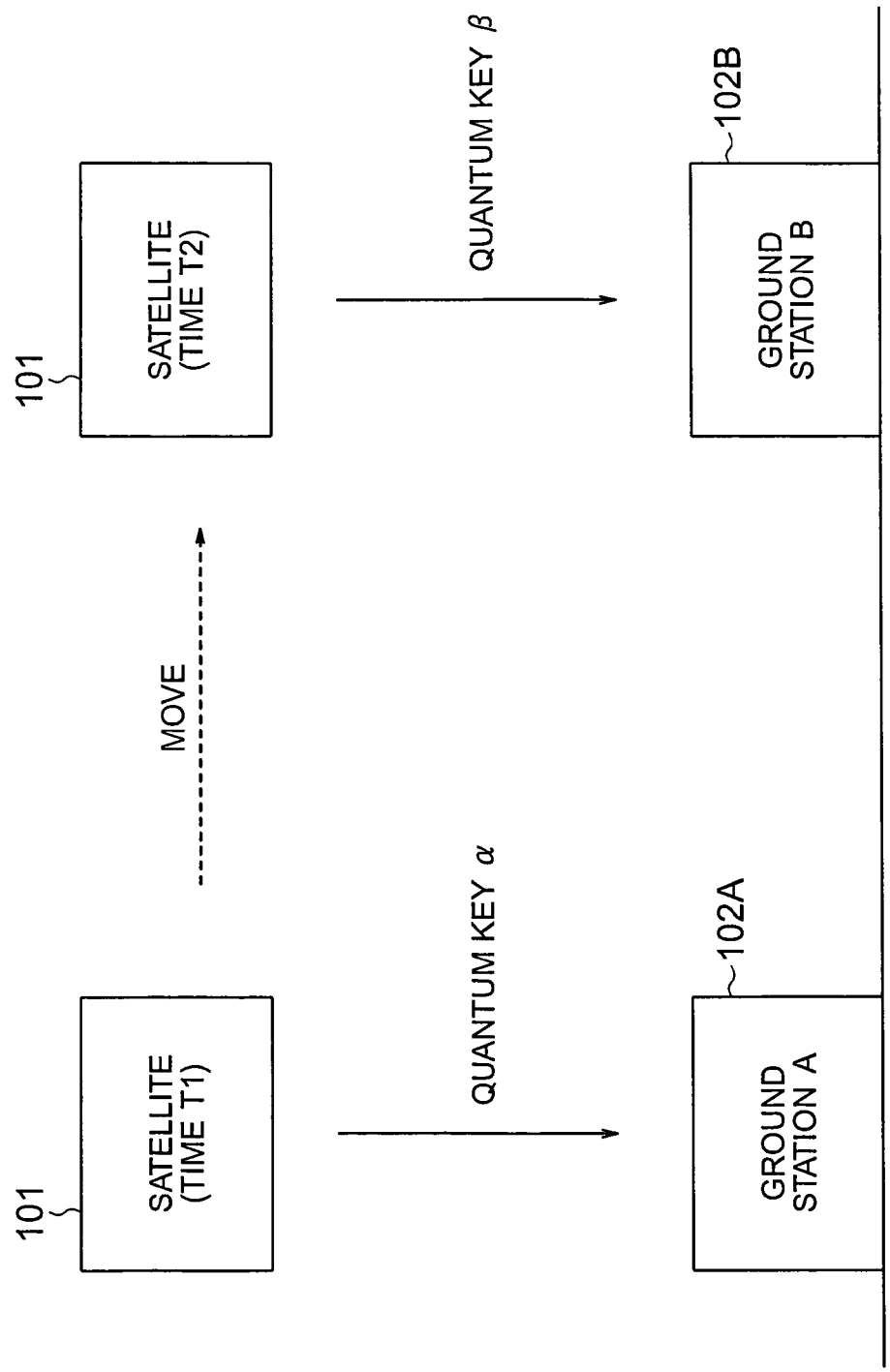
FIG. 6 is a diagram illustrating an application example of the quantum cryptography communication according to the present invention.

FIG. 6 is a diagram illustrating an application example of the quantum cryptography communication according to the present invention.

The satellite as the transmitter 101 is located over a ground station A at time T1. At this point, the satellite generates a quantum key α (e.g., 1001), superimposes the quantum key α on data A, and transmits the data A and the quantum key α to the ground station A. The ground station A receives and stores the data A and the quantum key α.

Thereafter, the satellite moves and is located over a ground station B at time T2. At this point, the satellite generates a quantum key β (e.g., 1010), superimposes the quantum key β on data B, and transmits the data B and the quantum key β to the ground station B. The ground station B receives and stores the data B and the quantum key β.

Further, the satellite generates a quantum key γ (in this case, 0011) according to exclusive OR of the quantum keys α and β (γ=αXORβ) and transmits the quantum key γ to the base stations A and B with, for example, normal communicating means. The quantum key γ may be wiretapped.

Thereafter, the ground station A generates the quantum key β of the partner ground station B according to exclusive OR of the quantum key α and the quantum key γ of the ground station A (β=αXORγ) using the quantum key α and the quantum key γ. In other words, for example, it is possible to learn β=1010. For example, the data A is data from the ground station B and a quantum key of the data is β. Similarly, the ground station B generates the quantum key α of the partner ground station A according to exclusive OR of the quantum key β and the quantum key γ of the ground station B (α=βXORγ) using the quantum key β and the quantum key γ. In other words, for example, it is possible to learn α=1001. For example, the data B is data from the ground station A and a quantum key of the data is α. Consequently, the ground stations A and B can share the quantum keys α and β by using the quantum key γ.

The present invention has been explained according to the embodiments thereof. However, various modifications of the present invention are possible within the scope of the gist of the present invention.

For example, in the above explanation, optical communication performed by using the ground stations and the satellite is explained. However, in the present invention, the transmitter 101 is not limited to the satellite. For example, the transmitter 101 only has to be a movable body such as an airplane, a ship, or an automobile that has a communication function and performs the mobile communication. Not only the transmitter 101 side but also the receiver 102 side may be a movable body. In other words, the present invention can be applied to optical communication between satellites. Further, the transmitter 101 side is not limited to the movable body and may be a fixed ground station. In other words, the optical communication may be optical communication between fixed stations on the ground (optical communication on the ground).

Signals transmitted and received according to the present invention may be data signals in various fields such as military, personal, and commercial confidential communication fields or other signals.

As explained above, according to the present invention, in the quantum cryptography communication apparatus and method, it is possible to make the classical communication path, for example, the transmission path including the optical fiber unnecessary, apply the quantum cryptography communication to the mobile communication in satellites and the like, and apply the quantum cryptography communication irrespective of a type of a communication signal.

What is claimed is:

1. A quantum cryptography communication apparatus that performs quantum cryptography communication between a transmitter and a receiver, the quantum cryptography communication apparatus comprising:
   a first communicating unit transmitting and receiving a communication signal between the transmitter and the receiver, the communication signal being a binary optical signal comprising a period of ON and a period of OFF and comprising pulse light stronger than a quantum cryptography signal; and
   a second communicating unit transmitting and receiving a quantum cryptography signal between the transmitter and the receiver in a period in which the communication signal is in the period of OFF in a period that the communication signal is transmitted and received, the quantum cryptography signal being a binary optical signal and comprising pulse light weaker than the communication signal,
   wherein the first communicating unit and the second communicating unit transmit and receive the communication signal and the quantum cryptography signal that is superimposed on the communication signal on the same optical axis.

2. The quantum cryptography communication apparatus according to claim 1, wherein the second communicating unit transmits and receives the quantum cryptography signal in the period in which the communication signal is off in synchronization with a falling edge of the communication signal after elapse of a delay time set in advance from the falling edge.

3. The quantum cryptography communication apparatus according to claim 1, wherein the first or second communicating unit includes counters incremented according to transmission speed of the communication signal and reset at a cycle longer than a propagation delay of the communication signal and detect a delay in relative time using the counters.

4. The quantum cryptography communication apparatus according to claim 1, wherein the second communicating unit transmits and receives a photon pulse of the quantum cryptography signal, and the first communicating unit performs polarization modulation for the communication signal according to a polarization base for the photon pulse of the quantum cryptography signal.

5. A quantum cryptography communication method for performing quantum cryptography communication between a transmitter and a receiver, the quantum cryptography communication method comprising:
   transmitting and receiving a communication signal between the transmitter and the receiver, the communication signal being a binary optical signal comprising a period of ON and a period of OFF and comprising pulse light stronger than a quantum cryptography signal; and transmitting and receiving a quantum cryptography signal between the transmitter and the receiver in a period in which the communication signal is in the period of OFF in a period that the communication signal is transmitted and received, the quantum cryptography signal being a binary optical signal and comprising pulse light weaker than the communication signal, wherein the transmitting and receiving of the communication signal and of the quantum cryptography signal that is superimposed on the communication signal occurs on the same optical axis.

* * * * *